US006986062B2

(12) United States Patent
Carpenter

(10) Patent No.: US 6,986,062 B2
(45) Date of Patent: *Jan. 10, 2006

(54) SET TOP BOX OBJECT SECURITY SYSTEM

(75) Inventor: Wiltse J. Carpenter, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 179 days.

This patent is subject to a terminal disclaimer.

(21) Appl. No.: 10/772,991

(22) Filed: Feb. 5, 2004

(65) Prior Publication Data

US 2004/0158722 A1 Aug. 12, 2004

Related U.S. Application Data

(63) Continuation of application No. 09/287,666, filed on Apr. 7, 1999, now abandoned.
(60) Provisional application No. 60/081,236, filed on Apr. 9, 1998, and provisional application No. 60/112,771, filed on Dec. 18, 1998.

(51) Int. Cl.
*H04L 9/00* (2006.01)
*G06F 15/16* (2006.01)
*G06F 3/00* (2006.01)

(52) U.S. Cl. ............... 713/201; 715/749; 719/311; 709/229

(58) Field of Classification Search ......... 709/200–203, 709/223–229; 713/200, 201; 715/700, 748, 715/749; 719/311, 313, 317, 320, 328; 345/700, 345/748, 749
See application file for complete search history.

(56) References Cited

U.S. PATENT DOCUMENTS 5,404,528 A * 4/1995 Mahajan .................... 719/320
5,903,732 A * 5/1999 Reed et al. ................. 709/229
5,974,549 A * 10/1999 Golan ........................ 713/200

(Continued)

OTHER PUBLICATIONS

Brown, "Special Edition Using Netscape 2", 1995, Que Corporation, $2^{nd}$ Edition, p. 935, 939, 942, 943, 962.*
"Finjan Announces Major Power Boost and New Features for SurfinShield 2.0" Nov. 18, 1996, web.archive.org/web/09970430041051/www.finjin.com/prsfs2_0.html, p. 1–3.*
"Products", 1996, 1997, web.archive.org/web/19970430031246/www.finjin.com/products.html, p. 1–10.*

*Primary Examiner*—Christopher Revak
(74) *Attorney, Agent, or Firm*—Workman Nydegger

(57) ABSTRACT

Systems and methods for controlling the ability of scripts to access objects defined at the client. The client stores an access control data structure having multiple entries. Each entry is associated with one or more objects for which access is to be controlled. The entries include a source identifier field containing one or more URLs and a permission identifier field containing data defining a permission. When the client receives a script from a script source, such as a web site, the client begins execution of the script until the script requests access to an object. The client identifies a relevant entry of the access control data structure, which is an entry that is associated with the requested object and lists the URL of the script source in the source identifier field. The client applies the permission defined by the permission identifier of the relevant entry to the request, thereby granting or denying access to the script. Thus, the client permits selected remote entities to exercise control over objects and, in turn, over components of the client, while preventing unauthorized scripts from accessing the objects.

22 Claims, 7 Drawing Sheets

U.S. PATENT DOCUMENTS

| | | | | |
|---|---|---|---|---|
| 5,978,484 | A | * 11/1999 | Apperson et al. | 705/54 |
| 6,092,194 | A | * 7/2000 | Touboul | 713/200 |
| 6,154,844 | A | * 11/2000 | Touboul et al. | 713/201 |
| 6,167,520 | A | * 12/2000 | Touboul | 713/200 |
| 6,275,868 | B1 | * 8/2001 | Fraley et al. | 719/320 |
| 6,745,245 | B1 | * 6/2004 | Carpenter | 709/229 |
| 2002/0016954 | A1 | * 2/2002 | Charisius et al. | 717/2 |
| 2002/0019941 | A1 | * 2/2002 | Chan et al. | 713/185 |
| 2002/0161996 | A1 | * 10/2002 | Koved et al. | 713/150 |
| 2004/0213224 | A1 | * 10/2004 | Goudreau | 370/389 |

OTHER PUBLICATIONS

Nackerud, "The Potential of CGI: Using Pre–Built CGI Scripts to Make Interactive Web Pages", Dec. 1998, Information Technology and Libraries, obtained from dialog text search, p. 1–11.*

Spitzer, "Caught in the crossfire" Oct. 1997, DBMS, V10, #11, obtained from dialog text search, p. 1–7.*

Mitchell, "Developing Enterprise Apps with Microsoft Visual J++", 1997, The Waite Group, p. 190, 191.*

"Signing with Microsoft Authenticode Technology" 1996, Microsoft Corporation, activex.adsp.or.jp/inetsdk/help/sweep/sweep075.htm, p. 1–16.*

"ActiveX Technology" 1997, InfoWorld, ww1.infoworld/com/cgi–bin/displayTC.pl?/970519analysis.htm, p. 1–15.*

Chu, "Trust Management for the World Wide Web", Jun. 13, 1997, Dept. of Electrical Engineering and Computer Sciences at the Massachusetts Institute of Technology, p. 1–53.*

"ActiveX technology, you can't go there today", 1997, InfoWorld Publishing, p. 1–15.*

Johansson, "Java Security and a Firewall Extension for Authenticity Control of Java Applets", Jan. 29, 1997, Computer Science Dept. University of Colorado at Colorado Springs, p. 1–6.*

"Signing with Microsoft Authenticode Technology", 1996, Microsoft Corporation, p. 1–16.*

Darnell, "Integrating Java and JavaScript", p. 1–11.*

Bank, "Java Security", Dec. 8, 1995, p. 1–11.*

* cited by examiner

| OBJECT | SOURCE IDENTIFIER | PERMISSION IDENTIFIER |
|---|---|---|
| DIALING | http://www.microsoft.com/dialing<br>http://www.tci.com/dialing | WRITE |
| DIALING | http://www.microsoft.com | READ |
| DIALING | OTHERS | NONE |
| TELEVISION | http://www.webtv.com | WRITE |
| TELEVISION | http://www.microsoft.com | READ |
| TELEVISION | OTHERS | NONE |

SET TOP BOX OBJECT SECURITY SYSTEM

CROSS-REFERENCE TO RELATED APPLICATIONS

This application is a continuation of U.S. patent application Ser. No. 09/287,666, filed Apr. 7, 1999, which is now abandoned, and which claimed priority to U.S. Provisional Patent Application Ser. No. 60/081,236, filed Apr. 9, 1998; and U.S. Provisional Patent Application Ser. No. 60/112,771, filed Dec. 18, 1998, all of which are incorporated herein by reference.

BACKGROUND OF THE INVENTION

The Field of the Invention

The present invention relates to security techniques that prevent unauthorized access to client computer resources when accessing the Internet. In particular, the present invention relates to systems, methods and associated data structures that enable a client computer to regulate the manner in which scripts received from the Internet are capable of accessing objects defined at the client computer.

In recent years, there has been a tremendous increase in the use of the Internet, especially the World Wide Web ("the web"). A client computer having access to the Internet can download digital information from server computers connected to the Internet. Client application and operating system software executing on client computers typically accept commands from a user and obtain data and services by sending requests to server applications running on server computers connected to the Internet.

Hypertext Transport Protocol ("HTTP") is commonly used to transport web documents from web sites operated by remote servers to client computers. A web site may use one or more web servers that store and distribute documents in one of a number of formats including the Hyper Text Markup Language (HTML). An HTML document can contain text, graphics, audio clips, and video clips, as well as metadata or commands providing formatting information. HTML documents also can include embedded links that reference other data or documents located on a remote web site, the local computer or network server computers thereby providing convenient access to the referenced data.

When accessing information over the web, client computers typically operate a client application, software component or operating system utility referred to as a web browser. The browser establishes a user interface by which the text, graphics, audio, video, and other types of retrieved information is communicated to the user.

Client computers that access web sites can be conventional personal computers. Alternatively, client computers can be set-top boxes that display web documents on a conventional television, one example being WebTV set-top boxes developed by WebTV Networks, Inc. of Mountain View, Calif. Set-top boxes capable of accessing the Internet bring a new dimension to television viewing. For instance, a web server can deliver to the set-top box information relating to television programming that enhances regular television content. Moreover, viewers can be referred to web sites that have information relating to a particular television program.

The practice of embedding executable scripts in web documents has become increasingly common. Scripts are software components or short pieces of executable code that perform a designated function with respect to the document displayed by the browser or another feature of the client computer. For example, scripts are widely used to modify the appearance of text or graphics displayed on the browser in response to input provided by the user. As a result, scripts represent one technique for establishing interactivity between the user and the document displayed by the browser. JavaScript and VBScript are examples of commonly-used languages by which scripts are encoded in web documents. When a browser receives a web document, it processes the information encoded therein, including executing any scripts that are encountered.

Occasionally, scripts received by a client computer from a web server perform operations that are not desired by the user. This may occur either because the script developer intentionally designed the script to perform a malicious operation or because a bug in the script causes an unwanted result. One way in which browsers have addressed the problem of undesirable operations being performed by scripts is to notify the user prior to executing scripts. For example, the browser can generate a dialog window each time a script is to be executed. The script is executed only if the user expressly grants permission. This approach can result in the user being repeatedly asked to grant permission to execute scripts. Faced with frequent interruptions, a user may respond hastily and improperly.

A more flexible technique for controlling the execution of scripts, and one which has been successful in dealing with the problems that it was designed to address, has been used in connection with the Internet Explorer developed by Microsoft Corporation of Redmond, Wash. In particular, current versions of the Internet Explorer exhibit a feature known as security zones, whereby executable code embedded in web documents is selectively executed or not executed, depending on the security level, or security zone, to which the originating web site is assigned. Using Internet Explorer security zones, a web site is assigned to one of the multiple zones by referencing the web site's universal resource locator. When the client system is to perform an operation based on a script embedded in a web page from a particular web site, the client system refers to the security zones to determine the security level associated with the web site. If the web site is associated with a security zone that grants permission to execute scripts, the client system executes the script; otherwise, the script is not executed. This technique for regulating the execution of scripts is an all or nothing approach. In other words, depending on the security zone to which a particular web site is assigned, either all or none of the scripts originating from the particular web site are authorized to be executed.

During recent years, the complexity of the interaction between scripts and the client computer environment has increased. Scripts often request access to objects at the client system that control properties or features of the browser or other components of the client system. For instance, controls defined according to the ActiveX specification developed by Microsoft Corporation represent one example of objects that can be accessed by scripts received by client computers from web servers. By accessing and modifying ActiveX controls and other objects, scripts are capable of modifying the appearance of a document displayed to the user, controlling features of the browser, and controlling other components of the client system.

Conventional systems cannot reliably and flexibly grant scripts access to individual objects defined at a client system. Without a sufficiently secure access control system, a malicious web site could take control of a set-top box from a user by manipulating an object that controls a tuner of the set-top box, thereby effectively blocking the user's commands.

Similarly, one could imagine that an unauthorized web site could mimic a set-top box billing web site to stealing credit card numbers or other sensitive information. In general, without a reliable access control system, scripts might gain access to objects at the client that define any of various types of properties, such as Internet dialing properties, enhanced television services, etc.

The full capabilities of accessing objects at client computers using scripts have not been completely realized because conventional access security systems, such as those described above, are not sufficiently flexible to adapt to the varied scripts and web sites that might attempt to access objects. For example, a particular web site might be trusted to change Internet dialing properties, but not trusted to change other properties at the client system. Conventional access security systems have not been capable of applying access control criteria to scripts with sufficient selectivity so as to allow a script originating at the web site to modify Internet dialing properties, while preventing the script from modifying other objects or properties at the client computer. Thus, it would be desirable to provide access control systems that allow scripts to access only certain objects and that operate with any desired degree of selectivity. Such access control systems would enable remote web sites to control properties and features of clients while preserving the security of clients.

BRIEF SUMMARY OF THE INVENTION

The present invention relates to security systems for regulating access by scripts to objects defined at a client computer. The client computer, according to the invention, maintains objects that can be used to control features and properties of the client computer. The objects can relate to display properties of a document displayed using a browser, other properties relating to the operation of the browser, and properties of other components of the client computer. The access control features of the invention regulate the ability of scripts received from web sites to gain access to the objects. Accordingly, scripts that originate from trusted web servers can exercise control over the client computer, while scripts originating from other web servers cannot. Moreover, the access control system can be defined with sufficient selectivity to enable scripts to have access to certain objects while not having access to other objects.

According to one aspect of the invention, an access control data structure having one or more entries is stored at the client computer. Each entry is associated with one or more script sources, which are commonly web servers capable of sending scripts to the client computer. Each entry also references one or more objects for which access is to be regulated. Each entry further can include a permission identifier representing a permission that is to be applied to scripts originating from the corresponding script sources.

The browser at the client computer receives web documents along with embedded scripts from a web server, processes the web document, and encounters the embedded script. If, during execution of the script, the script attempts to gain access to one or more of the objects maintained by the client computer, the browser initiates a process of determining whether the script is authorized to access the objects. The client computer identifies the relevant entry in the access control data structure, which will be used to determine whether the script is authorized to access the requested object. The relevant entry is the entry that is associated with the requested object and has a source identifier that corresponds to the source of the script. The permission defined by the permission identifier included in the relevant entry is applied to the script being executed by the browser. If the permission allows the script to gain the requested access to the object, the script is then permitted to access the object. The permission might be read permission, whereby the script is capable of only reading information associated with the object, or can be write permission, whereby the script is permitted to modify the information associated with the object.

The access security system of the invention is sufficiently flexible to allow selected web sites to exercise control over certain features of the client computer while preventing them from controlling other features. For example, scripts originating from a particular bank can be authorized to modify objects associated with a smart card reader, without being authorized to modify other objects at the client system. Another web site associated with an Internet service provider might be permitted to control Internet dialing properties of the client computer. The entries of the access control data structures can be configured to selectively permit access to an essentially unlimited number and variety of objects at the client computer. Moreover, the access control data structures can be configured to selectively allow scripts to access individual objects, which is in contrast to the conventional all-or-nothing approach that has sometimes been used to grant or deny access to all objects.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention relates to techniques for establishing and enforcing security measures that regulate the ability of scripts received by a client computer to access objects defined at the client computer. According to one embodiment of the invention, the client computer accesses the Internet and receives a script from a remote script source such as a web site. The script can be embedded in an HTML or other type of document. As the client processes the document and begins to execute the script, the script requests access to an object at the client, such as read or write access. Before granting the script access as requested, the client determines whether an access control data structure maintained at the client authorizes the access. The access control data structures of the invention can be configured with sufficient detail to grant or deny access that has been requested by scripts originating from specific script sources and to grant or deny such scripts access to specific objects.

The invention is described below by using diagrams to illustrate either the structure or processing of embodiments used to implement the systems and methods of the present invention. Using the diagrams in this manner to present the invention should not be construed as limiting of its scope. The embodiments of the present invention may comprise a special purpose or general purpose computer including various computer hardware, as discussed in greater detail below.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
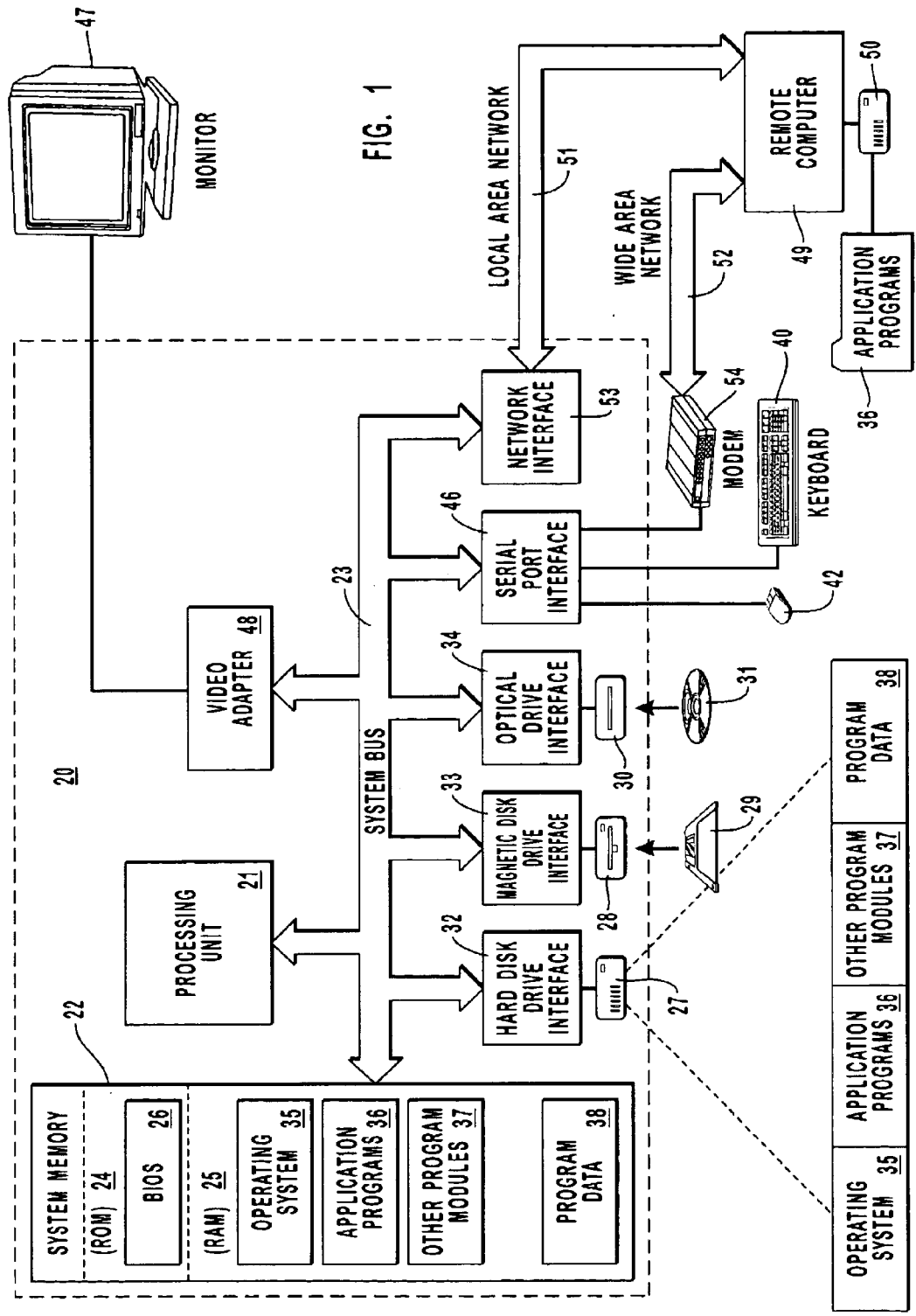
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk, a removable magnetic disk 29 and a removable optical disk 31, other types of computer readable media for storing data can be used, including magnetic cassettes, flash memory cards, digital video disks, Bernoulli cartridges, RAMs, ROMs, and the like.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
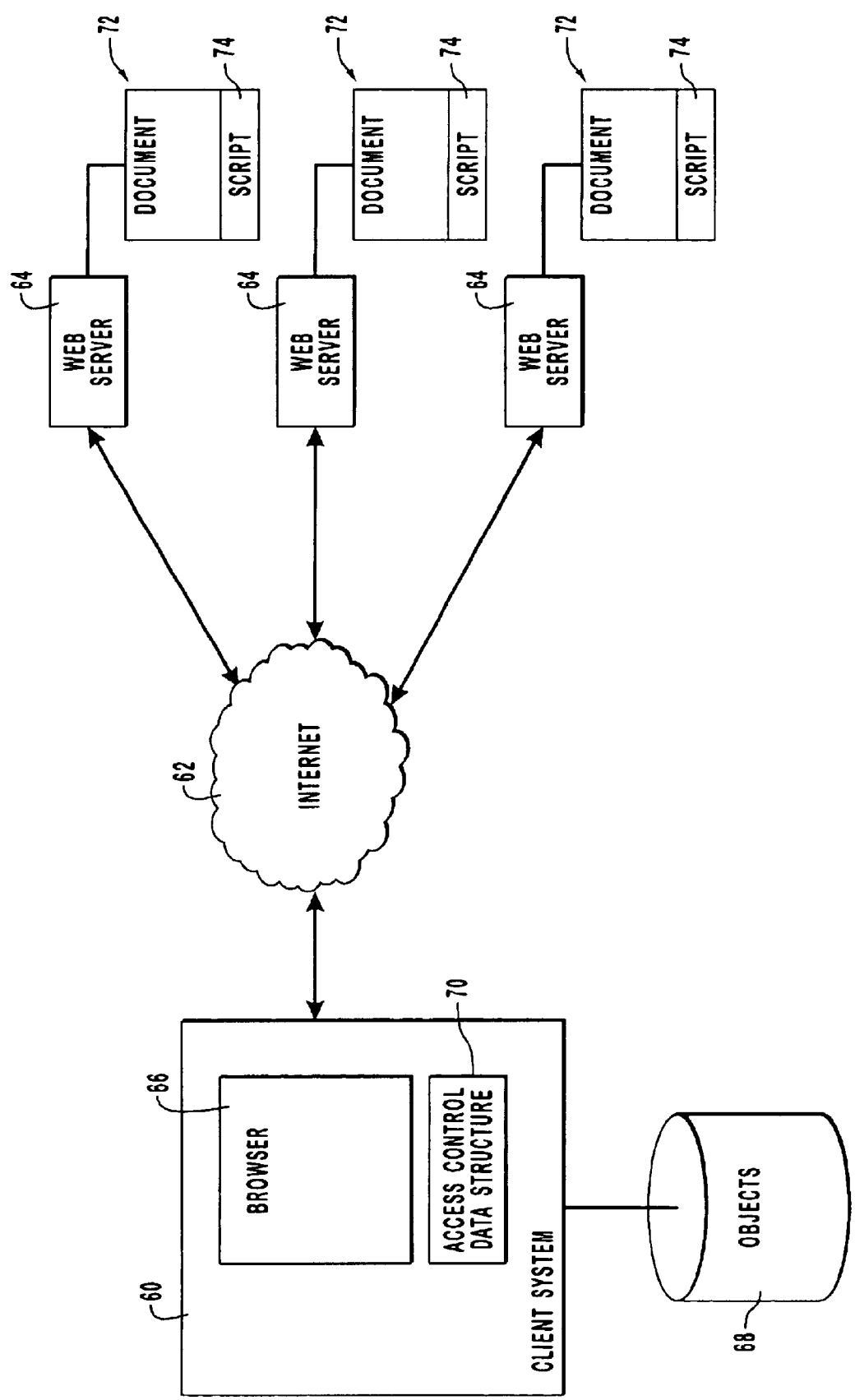
FIG. 2 is a schematic diagram illustrating a suitable network environment in which the invention can be practiced.

FIG. 2 illustrates an exemplary network environment in which the invention can be practiced. In FIG. 2, client system 60 has access to Internet 62, whereby information stored at web servers 64 can be retrieved. Client system 60 can be any general purpose or special purpose computer. For instance, client system 60 can be a personal computer that accesses Internet 62 by means of a telephone modem, a cable modem, or any other suitable communications device. Alternatively, client system 60 can be a set-top box that is associated with a television and adapted to access Internet 62. The principles disclosed herein are not limited to environments associated with the Internet, but instead can be used with substantially any other local area or wide area network.

Client system 60 operates a browser 66, which can be a client application, software component, or operating system utility that enables information received from web server 64 to be displayed or otherwise communicated to the user. Functional components of browser 66 will be described in greater detail in reference to FIG. 3. Various properties, features, and operations at client system 60 can be defined by objects 68 stored at client system 60. Objects 68 can be defined according to the Document Object Model (DOM), ActiveX, an expansion of DOM achieved using ActiveX, or another object model. The nature of objects 68 according to one embodiment of the invention is further described herein in reference to FIG. 4.

Each web server 64 can include one or more web sites, each of which can represent a "script source", an "information source" or a "remote network component" as defined herein. A script source is any entity or location from which client system 60 is capable of receiving a script. The data contained within a directory structure stored on a web server may constitute a web site.

Client system 60 further includes an access control data structure that regulates the ability of scripts received by client system 60 from web server 64 to access and modify objects 68. When client system 60 receives a document 72 and an embedded or otherwise associated script 74 from any of web servers 64, the browser applies the security settings defined by access control data structure 70 for allowing script 74 to access or modify objects 68. An exemplary access control data structure 70 will be described in greater detail herein in reference to FIG. 5.

Client system 60 identifies the web server, any of the one or more web sites associated with the web server, or any document stored at a web site by using the Uniform Resource Locator (URL) associated therewith. Each resource accessible over to the Internet has a unique URL that can be understood as representing a protocol and an address of the resource. Conventional URLs consist of a scheme or protocol identifier and a path. An example of a URL is http://www.microsoft.com/dialing. In this example, the scheme or protocol identifier is http://, while the path is www.micrsoft.com/dialing. There are other scheme or protocol identifiers, such as file:, https:, and ftp:. The path portion of the URL represents the address of the web site and the location of the requested document within the directory structure.

Figure 3:
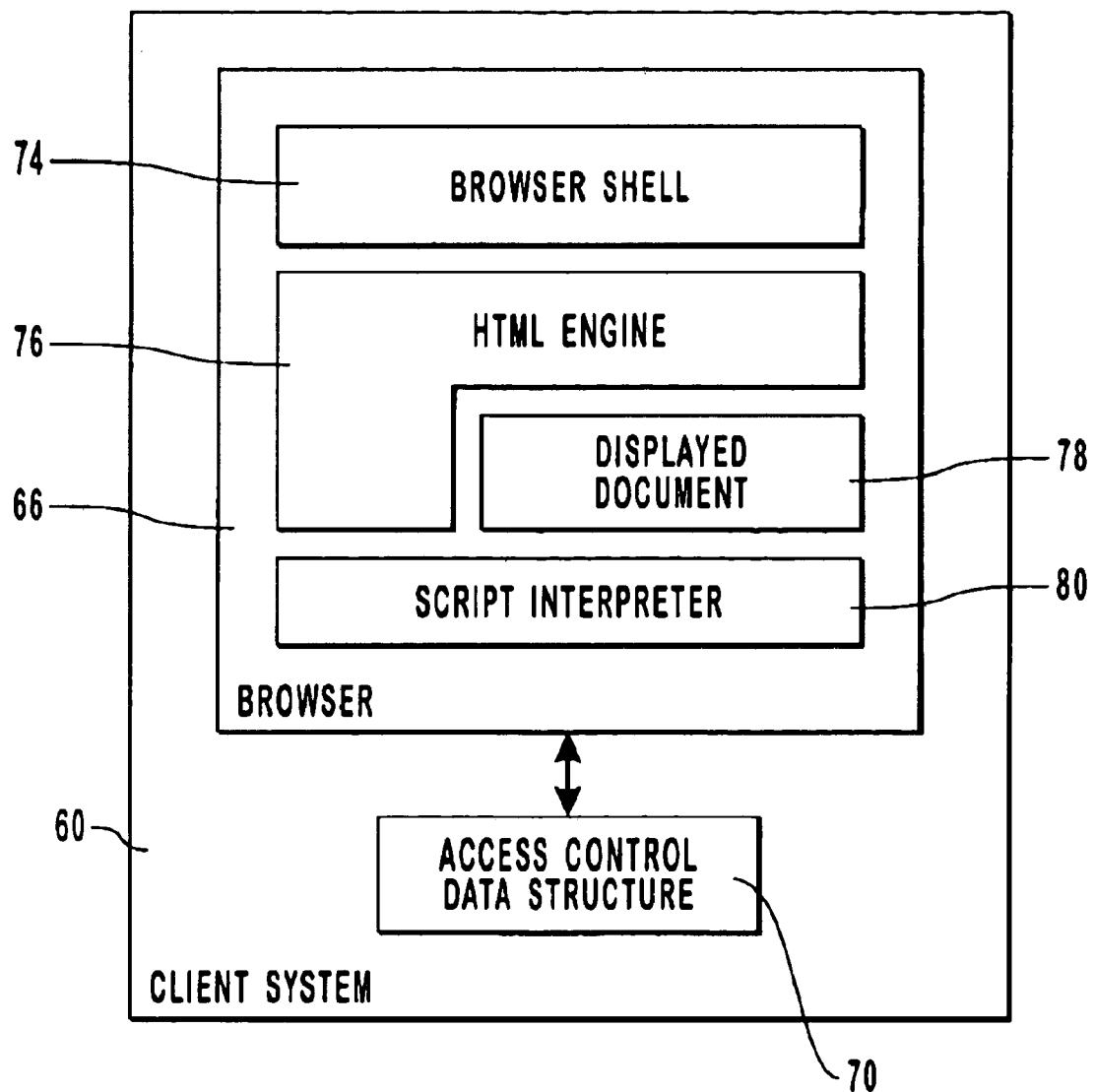
FIG. 3 is a schematic diagram depicting an access control data structure and functional components of a browser residing at the client computer.

FIG. 3 illustrates in greater detail the functional components of one example of a browser that can be used with the invention. Browser 66 includes a browser shell 76 that establishes a graphical user interface including a window in which web documents are to be displayed, tool bars and buttons representing various functions performed by the browser, and the like. Browser shell 74 also includes executable code for transmitting information to the Internet and receiving information and web documents from the Internet. HTML engine 76 of browser 66 includes executable code that processes HTML documents received from web servers. While HTML is a common data format in which web documents are encoded, browser 66 are usually capable of processing information encoded in other data formats. Displayed document 78 represents, for example, an HTML document having been processed by HTML engine 76 and displayed to the user. Displayed document 78 can represent text, graphics, audio, video, and other types of information that is communicated to the user. A script interpreter 80 executes scripts that may be embedded in the web document and also initiates the process of determining whether the scripts are to be granted permission to access any requested objects at client system 60.

The Document Object Model is a framework by which various elements of a web page can be named and interrelated. Using DOM, a web document is represented by a hierarchical tree wherein each node represents an element of the web page. The DOM combined with a scripting language, such as VBScript or JavaScript, allows elements of a web page to be dynamically controlled, and forms the basis of a dynamic hypertext mark-up language (DHTML) documents. DOM and DHTML are supported by Internet Explorer 4 and later versions developed by Microsoft Corporation.

Figures 4, 5:
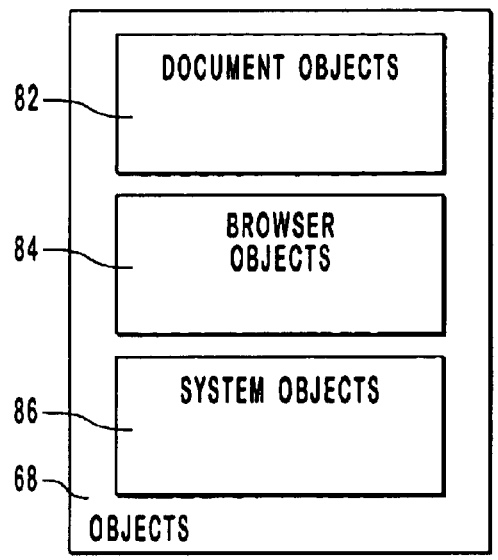
FIG. 4 represents classification of objects defined at the client computer, including document objects, browser objects, and system objects.
FIG. 5 illustrates a portion of an exemplary access control data structure that defines the ability of scripts to access selected objects at the client computer.

DOM can be extended to control objects outside of the web page being displayed to the user. For example, as shown in FIG. 4, objects 68 defined at client system demonstrates document objects 82, browser objects 84, and system objects 86. Document objects 82 are defined as objects that relate to properties or features of a web document processed by a browser. An example of document objects 82 are those that relate to the appearance and position of text or graphics in a web document. Browser objects 84 include objects that relate to properties or features of a browser other than the document. For instance, browser objects 84 can be those that relate to the history list of pages processed by the browser, a status line or title bar displayed by the browser, etc. System objects 86 include objects that relate to properties or features of the client computer other than the browser and the web document. For example, system objects 86 can relate to an essentially unlimited and varied number of features of the client computer, including Internet dialing properties of the computer, smart card readers, any other peripherals, enhanced television services (if the client computer is a set top box) and the like.

When scripts can access not only document objects 82, but also browser objects 84, and system objects 86, the web site from which the scripts originated can control substantially any desired function of the client computer. In one embodiment of the invention, the client computer includes the object 68 of FIG. 4 including document object 82, browser object 84, and system object 86, while selectively allowing scripts received from remote script sources to access and modify these objects. The access control features of the invention allow scripts to selectively control the client computer while preventing unauthorized web sites to gain access to the client computer in potentially harmful ways.

FIG. 5 is a portion of a representative access control data structure that can be used according to the invention to define which scripts received by the client system are authorized to access certain objects at the client computer. In this embodiment, access control data structure 70 includes a plurality of entries 88, each having at least three data fields. In particular, each entry 88 includes an object field 90, a source identifier field 92, and a permission identifier field 94. While access control data structure 90 is illustrated as a single structure, each object can maintain a separate list of one or more entries that define access to the object. The collection of entries, whether centralized or distributed, represents an access control data structure as defined herein.

The information included in the object field 90 represents the object or objects for which access by scripts is to be controlled. In the example of FIG. 5, entry 88A has an object field 90 specifying a "dialing" object. The "dialing" object shown at FIG. 5 is associated with the dialing properties of the client computer, whereby the client computer gains access to an Internet service provider. The "television" object of FIG. 5 is associated with the ability of the client to receive enhanced television services, assuming the client is a set-top box or another computer that is compatible with television programming.

Source identifier field 92 includes one or more URLs associated with a potential source of scripts. Entries 88 regulate the ability of scripts originating from the web sites defined in field 92 to access the objects defined in the corresponding fields 90. In the example of FIG. 5, source identifier field 92 of entry 88A includes the URLs http://www.microsoft.com/dialing and http://www.tci.com/dialing. The ability of scripts having these URLs to access the dialing object is regulated by entry 88A.

The permission to be applied to the script associated with a particular entry 88 is defined by the information included in the permission identifier field 94. These permissions specify the degree to which the scripts have access, if any, to the associated objects. In the example of FIG. 5, the permissions defined in permission identifier field 94 include write or read permissions or no permission. Permission identifier field 94 of entry 88A specifies a write permission, which is to be applied to any scripts that originate from the URLs listed in the corresponding source identifier field 92 and request access to the dialing object. In one implementation, write permission can be defined to include read permission and any other permission that might be desired. Alternately, other permissions could be used, such as "all", "prompt", or others. For instance, "all" could be used to represent both read and write permission. "Prompt" can indicate that the user is to be prompted by displaying a dialog box or by other means when a script from a particular script source is to be executed. Using the prompt permission, the script is granted access to the requested object only if the user expresses consent.

In the embodiment of FIG. 5, if a script source is not explicitly listed in a source identifier field 92, it is assigned to a default entry. Entry 88B of FIG. 5 is a default entry that is applied to scripts that request access to the dialing object and that originate from a script source that is not otherwise explicitly listed in another entry. Default entries in FIG. 5 include in the source identifier field 92 the code "others." Alternatively, the access control data structures used with the invention can omit default entries such as entry 88B. In this case, if a script source is not explicitly listed in an entry, it is assumed that access to the requested object is denied. Furthermore, the information in source identifier fields 92 can be interpreted as being applicable to any URL that is hierarchically dependent from the listed URL. For example, entry 88C could be applied to a script originating from http://www.tci.com/dialing/number, since this URL is hierarchically dependent from http://www.tci.com/dialing.

Figure 6:
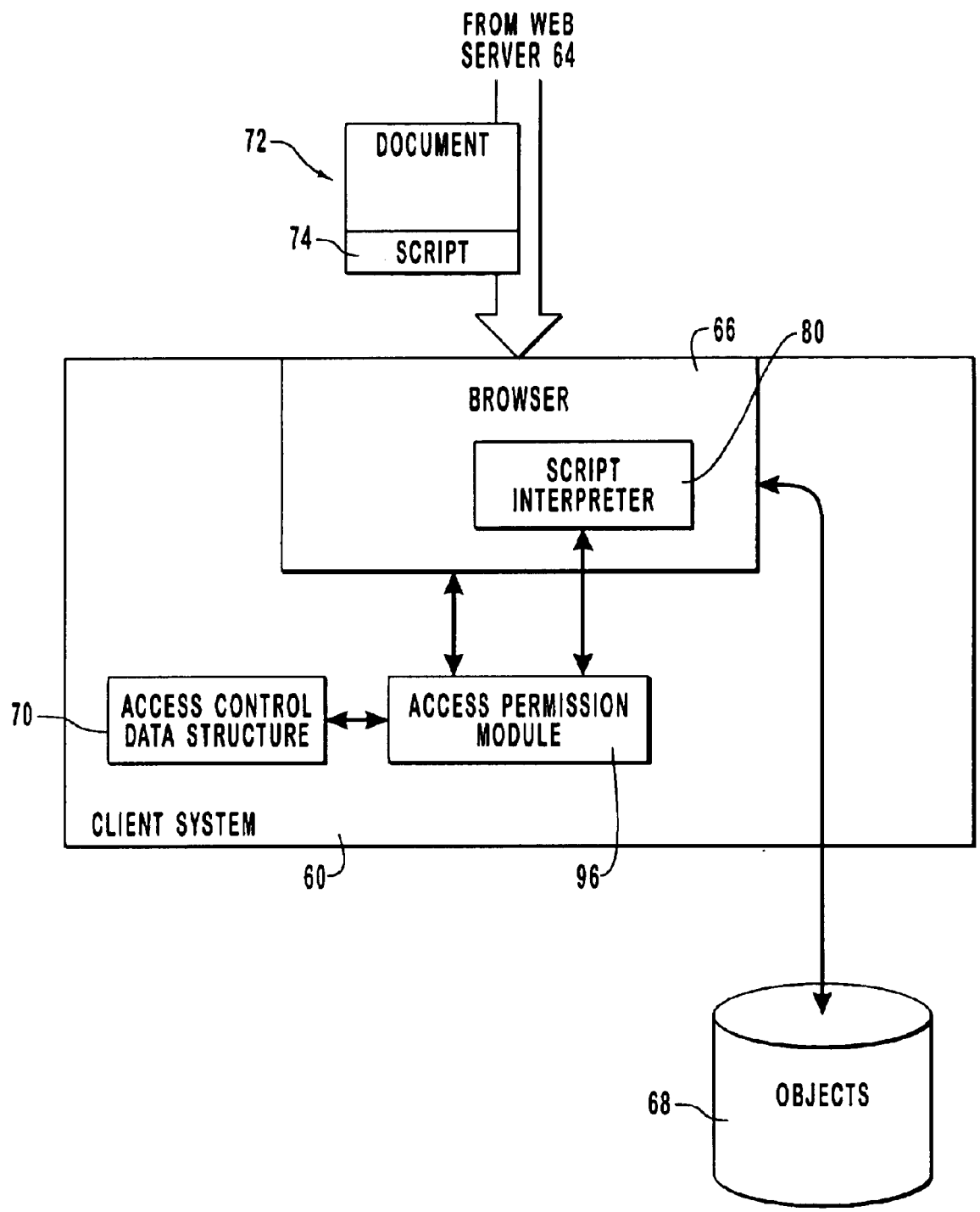
FIG. 6 is a schematic diagram illustrating a technique according to one embodiment of the invention for granting or denying a script permission access to an object at the client computer.

FIG. 6 is a schematic diagram representing a process by which the permissions defined by the access control data structure are applied to a script as it is executed by the browser. In FIG. 6, browser 66 operating at client system 60 can receive a document 72 and an embedded script 74 from web server 64. Browser 66 begins processing document 72 and encounters script 74. Script interpreter 80 begins executing script 74 until the script requests access to one of objects 68. Before granting or denying the request, an access permission module 96 at client system 60 is notified by browser 66 that the script has requested access to the particular object 68. Access permission module 96 uses access control data structure 70 to determine whether the script is authorized to gain access in the requested way to the object 68.

Access permission module 96 receives from browser 66 the URL associated with the source of script 74 and information specifying the object 68 for which access is requested. Access permission module 96 then finds the relevant entry 88 in access control data structure. The relevant entry is the entry whose source identifier field includes the URL of the script source and whose object field specifies the requested object. The access permission module 96 then applies the permission defined by the permission identifier field to the script. Script interpreter 80 grants or denies the requested access based on the applied permission.

In the first example, assume that script 74 of FIG. 6 has been received from a script source having the URL http://www.webtv.com/tvservice. Assume further that script 74 requests access to a television object in an attempt to activate or deactivate a particular enhanced television service at client system 60. As script interpreter 80 executes script 74, access permission module 96 determines whether, according to access control data structure 70, script 74 is authorized to write to the television object. Referring to FIGS. 5 and 6, access permission module 96 determines that entry 88C lists, in its source identifier field 92, URL http:// www.webtv.com. Access permission module 96 also determines that the URL of the script source, namely, http://www.webtv.com/tvservice is not listed in its entirety in any entry 88 that specifies the requested television object. However, the URL of the script source defines a location in the directory structure that depends hierarchically from the URL http://www.webtv.com.

Access permission module 96 applies the write permission included in the permission identifier field 94 of entry 88C to the script being executed by browser 66. Thus, the script is granted write access to the television object. The script can modify the television object to activate or deactivate enhance television services at client system 60.

In another example, assume that document 72 and the embedded script 76 are received by browser 66 from a script source having the URL http://www.unknownsource.com. In this example, browser 66 processes document 72 and encounters script 74. Script interpreter 80 begins executing script 74 and encounters a request for read access to the dialing object of client system 60. In response to the request, access permission module 96 identifies the relevant entry of access control data structure 70. Because the URL of the script source, http://www.unknownsource.com, is not explicitly listed along with the dialing object in any of entries 88, the relevant entry is the default entry, namely entry 88B. The permission identifier field 94 of entry 88B indicates that no access permission is granted to the script. Accordingly, access permission module 96 notifies script interpreter 80 that the requested access has been denied. Based on the access denial, the remainder of the script can be executed to the extent that it does not require access to the dialing object or, alternately, execution of the script is terminated. In this manner, the access control system of the invention prevents scripts from gaining unauthorized access to objects 68.

Figure 7:
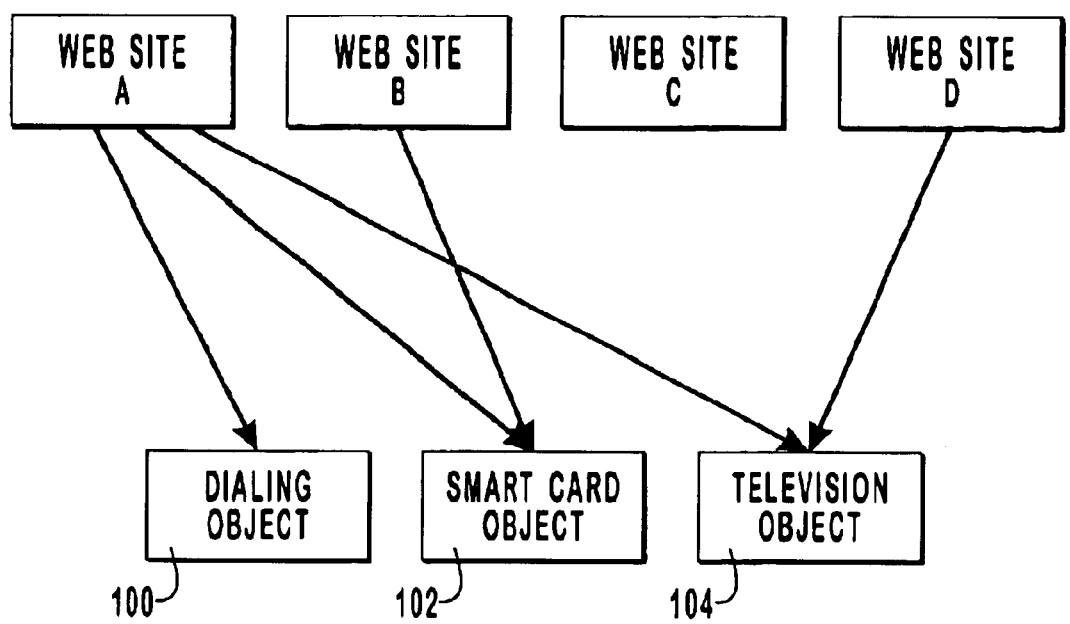
FIG. 7 is a schematic diagram representing the manner in which scripts originating at selected web servers can be authorized to access only certain objects defined at the client computer.

FIG. 7 illustrates a manner in which the access control data structure and the other access security features of the invention are sufficiently flexible to allow some web sites to access all objects, other web sites to access no objects, and still other web sites to access fewer than all of the objects. This is accomplished by creating entries in access data control structure 70 that refer to individual objects or groups of objects. In FIG. 7, web site A has access to dialing object 100, smart card object 102, and television object 104. Thus, web site A is granted access to all objects depicted in FIG. 7. Web site A is likely a known web site that is trusted to not transmit scripts to the client system that will control objects in undesirable ways. For example, web site A could be a web site operated by the same entity that has developed or manufactured the client system or the browser disclosed herein.

Web site C is denied access to all objects depicted in FIG. 7. Web site C could be a web site that is not known to the entity that establishes the access security data structure or might be a web site that is known to distribute scripts that could be harmful to the client system. Web site B is granted permission to access smart card object 102, while being denied access to dialing object 100 and television object 104. Web site B might be operated by a bank or another financial institution that issues the smart cards to be read by a smart card reader associated with smart card object 102. Thus, web site B is trusted to appropriately control the smart card object 102. Web site D is granted permission to access television object 104 while being denied access to dialing object 100 and smart card object 102. In this case, web site D might be associated with a television service provider that delivers enhanced television services to a client system. As such, web site D is trusted to appropriately control television object 104 in order to enable or disable the television services. However, web site D has not been given authority to modify smart card properties or dialing properties of the client system.

As illustrated in the foregoing example of FIG. 7, the access security criteria implemented by the access control data structure can be as complex as desired to selectively grant or deny access to script originating from a variety of web sites. By defining access by scripts to objects on an object-by-object basis, scripts originating from one source can alternatingly be denied access to one object and denied access to another object as successive scripts are received by the set-top box.

The access control data structures disclosed herein can be created, updated, modified, or deleted by any of a number of techniques that preserve the security of the system. One example of a method and system for managing the content of the access control data structures is disclosed in U.S. patent application Ser. No. 09/287,247, filed Apr. 7, 1999, which is now U.S. Pat. No. 6,745,245, incorporated herein by reference.

Figure 8:
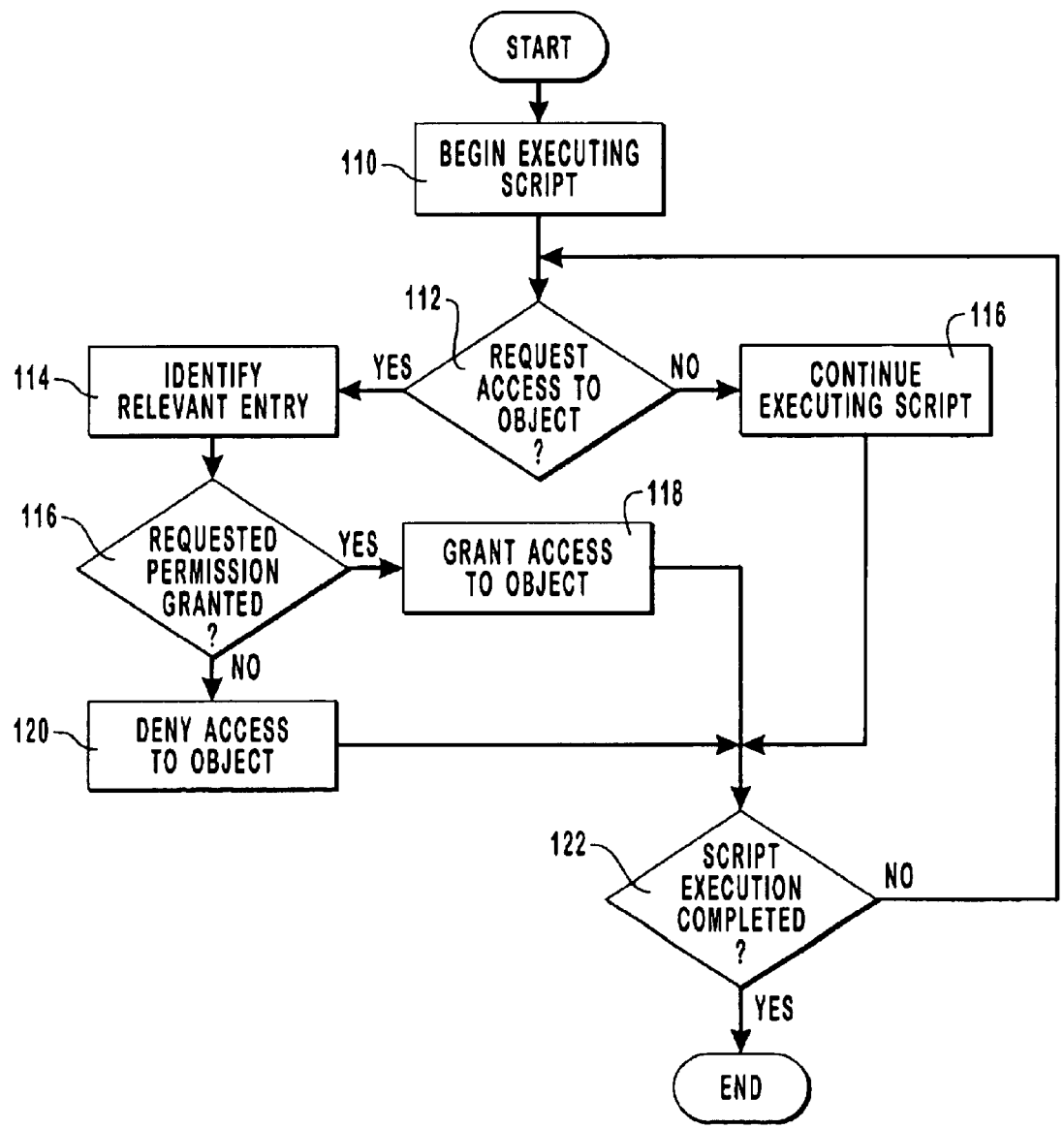
FIG. 8 is a flow diagram representing selected steps of a method for granting or denying to scripts permission to access objects at the client computer.

FIG. 8 summarizes one embodiment of the methods for selectively granting or denying access of scripts to objects at the client computer. In step 110, the browser begins executing a script received via the Internet from a script source. While executing a script, the client computer determines if the script requests access to an object the client system. If the script has requested access to an object, the method advances from decision block 112 to step 114. Otherwise, the method proceeds to step 116, in which the browser continues executing the script.

In step 114, the relevant entry of the access control data structure is identified. As shown at decision block 116, if the relevant entry grants the requested permission, the method advances to step 118, in which the script is granted access to the object. If the requested access is granted in step 118, the script can then read the object if read permission has been granted or can modify the object if write permission has been granted. If the requested permission has not been granted, the method advances from decision block 116 to step 120, wherein the script does not gain access to the object. After access has been granted or denied, the method proceeds to decision block 122. If script execution is not complete, the method returns to decision block 112, otherwise, the process illustrated in FIG. 8 is complete.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a client system that includes various client system components, and that is configured to receive one or more scripts from one or more script sources, the client system also including one or more objects that are configured to control properties and features of the client system components, a method of selectively granting or denying a script access to one or more of the objects, comprising acts of:

receiving at the client system, a script from a script source, the script requesting access to a particular system object;

accessing an access control data structure that is independent of the script and making a determination that the script is authorized to access the particular system object based on one or more permissions that are associated with the script source and the particular system within the access control data structure;

selectively granting the script access to the particular system object based on the determination.

2. A method as defined in claim 1, wherein:
the method further comprises an act of storing, at tho client system the access control data structure, wherein the access control data structure includes having one or more entries, each entry being associated with an object and including a source identifier representing one or more information sources and a permission identifier defining a permission; and
the act of making the determination comprises acts of:
identifying an entry of the access control data structure that is associated with the particular object and has a source identifier representing the information source from which the script has been received; and
applying the permission defined by the permission identifier included in the identified entry to the script.

3. A method as defined in claim 1, wherein the particular object is a document object relating to a document displayed by the browser.

4. A method as defined in claim 1, wherein the particular object is a browser object relating to the browser other than any document displayed by the browser.

5. A method as defined in claim 1, wherein the particular object is a system object relating to a component of the client system other than the browser and any document displayed by the browser.

6. In a client system that includes various client system components, and that is configured to receive one or more scripts from one or more script sources, the client system also including one or more objects that are configured to control properties and features of the client system components, a method of selectively granting or denying a script access to one or more of the objects, comprising acts of:
storing at the client system an access control data structure having one or more entries, each entry being associated with an object for which access is to be controlled and including a source identifier representing one or more script sources and a permission identifier defining a permission;
receiving a script from a particular script source, wherein the script, if fully executed by the browser, would request access to a particular object;
identifying an entry of the access control data structure that is independent of the script and that is associated with the particular object and has a source identifier representing the particular script source; and
applying the permission defined by the permission identifier included in the identified entry to the script, such that access by the script to the particular object is based upon one or more permissions that are associated with the script source and the particular system object and that are independent of the script.

7. A method as defined in claim 6, wherein the identified entry is associated with and controls access to only one system object.

8. A method as defined in claim 6, wherein the applied permission is a write permission, the method further comprising:
an act of executing the script such that the script accesses the particular object; and
an act of modifying the particular object by the script.

9. A method as defined in claim 6, wherein the applied permission specifies that access to the particular object by the script is denied, the method further comprising an act of denying the script access to the particular object.

10. A method as defined in claim 6, wherein the source identifier corresponds to a universal resource locator or the one or more script sources that the source identifier represents.

11. A method as defined in claim 10, wherein the act of identifying an entry of the access control data structure comprises an act of comparing the source identifiers of the entries whit the universal resource locator of the script source.

12. A method as defined in claim 6, wherein the script, if fully executed, would request access to at least two system objects, including the particular object and a second object, the method further comprising acts of:
identifying a second entry of the access control data structure, wherein the second entry is associated with the second object the source identifier of the second entry represents the particular script source; and
applying the permission defined by the permission identifier included in the second entry to the script such that access by the script to the second object is controlled.

13. A method as defined in claim 12, wherein the permission defined by the permission identifier included in the identified entry is different than the permission defined by the permission identifier included in the second entry.

14. A method as defined in claim 6, further comprising acts of:
receiving a second script from the particular script source, wherein the second script, if fully executed by the browser, would request access to a second object;
identifying a second entry of the access control data structure, wherein the second entry is associated with the second object and the source identifier of the second entry represents the particular script source; and
applying the permission defined by the permission identifier included in the second entry to the second script such that access by the second script to the second object is controlled.

15. A method as defined in claim 14, wherein the permission defined by the permission identifier included in the identified entry is different than the permission defined by the permission identifier included in the second entry.

16. A computer program product for use in a client system that includes various client system components, and that is configured to receive one or more scripts from one or more script sources, the client system also including one or more objects that are configured to control properties and features of the client system components, the computer program product comprising:
one or more computer-readable media having computer-executable instructions for implementing a method of selectively granting or denying a script access to one or more of the objects, comprising acts of:
receiving, at the client system, a script from a script source, the script requesting access to a particular system object;
accessing an access control data structure that is independent of the script and making a determination that the script is authorized to access the particular system object based on one or more permissions that are associated with the script source and the particular system within the access control data structure; selectively granting the script access to the particular system object based on the determination.

17. A computer program product as recited in claim 16, wherein:
the method further comprises in act of storing, at the client system the access control data structure, wherein the access control data structure includes one or more entries, each entry being associated with an object and including a source identifier representing one or more information sources and a permission identifier defining a permission; and the act of making the determination comprises acts of:
   identifying an entry of the access control data structure that is associated with the particular object and has a source identifier representing the information source from which the script has been received; and
   applying the permission defined by the permission identifier included in the identified entry to the script.

18. A computer program product as recited in claim 17, wherein the applied permission is a write permission, the method further comprising:

an act of executing the script such that the script accesses the particular object; and an act of modifying the particular object by the script.

19. A Computer program product as recited in claim 17 wherein the source identifier corresponds to a universal resource locator of the one or more script sources that the source identifier represents.

20. A computer program product as recited in claim 17, wherein the act of identifying an entry of the access control data structure comprises an act of comparing the source identifiers of the entries with the universal resource locator of the script source.

21. A computer program product as recited in claim 16, wherein the particular object is a document object relating to a document displayed by tho browser.

22. A computer program product as recited in claim 16, wherein the particular object is a browser object relating to the browser other than any document displayed by the browser.

* * * * *

UNITED STATES PATENT AND TRADEMARK OFFICE
CERTIFICATE OF CORRECTION

PATENT NO. : 6,986,062 B2
APPLICATION NO. : 10/772991
DATED : January 10, 2006
INVENTOR(S) : Wiltse J. Carpenter It is certified that error appears in the above-identified patent and that said Letters Patent is hereby corrected as shown below:

On the Title Page on page 2, Item (56), under "Other Publications", line 4, delete "ww1" and insert -- www --, therefor.

In column 11, line(s) 42–50, delete "FIG. 7, web site A has access to dialing object 100, smart card object 102, and television object 104. Thus, web site A is granted access to all objects depicted in FIG. 7. Web site A is likely a known web site that is trusted to not transmit scripts to the client system that will control objects in undesirable ways. For example, web site A could be a web site operated by the same entity that has developed or manufactured the client system or the browser disclosed herein." and
insert -- FIG. 7, web site A has access to dialing object 100, smart card object 102, and television object 104. Thus, web site A is granted access to all objects depicted in FIG. 7. Web site A is likely a known web site that is trusted to not transmit scripts to the client system that will control objects in undesirable ways. For example, web site A could be a web site operated by the same entity that has developed or manufactured the client system or the browser disclosed herein. -- on line 41 after "In" as the continuation of the paragraph.

In column 12, line 59, in Claim 1, after "receiving" insert -- , --.

In column 13, line 4, in Claim 2, delete "tho" and insert -- the --, therefor.

In column 14, line 2, in Claim 10, delete "or" and insert -- of --, therefor.

In column 14, line 7, in Claim 11, delete "whit" and insert -- with --, therefor.

In column 14, line 66, in Claim 17, delete "in" and insert -- an --, therefor.

In column 16, line 1, in Claim 19, delete "Computer" and insert -- computer --, therefor.

In column 16, line 1, in Claim 19, after "claim 17" insert -- , --.

UNITED STATES PATENT AND TRADEMARK OFFICE
CERTIFICATE OF CORRECTION

PATENT NO.       : 6,986,062 B2
APPLICATION NO.  : 10/772991
DATED            : January 10, 2006
INVENTOR(S)      : Wiltse J. Carpenter It is certified that error appears in the above-identified patent and that said Letters Patent is hereby corrected as shown below:

In column 16, line 12, in Claim 21, delete "tho" and insert -- the --, therefor.

Signed and Sealed this

Twenty-ninth Day of September, 2009

David J. Kappos
*Director of the United States Patent and Trademark Office*